United States Patent [19]
Truskalo et al.

[11] Patent Number: 6,081,078
[45] Date of Patent: *Jun. 27, 2000

[54] VERTICAL DEFLECTION CIRCUIT WITH RASTER CORRECTION

[75] Inventors: Walter Truskalo; Peter Ronald Knight, both of Indianapolis; Lawrence Edward Smith, Noblesville, all of Ind.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/649,409

[22] Filed: May 17, 1996

[51] Int. Cl.[7] .............................. G09G 1/04; H01J 29/70; H04N 3/22
[52] U.S. Cl. ........................ 315/371; 315/395; 348/806
[58] Field of Search ..................... 315/371, 393, 315/395, 405, 403, 398; 348/806

[56] References Cited

U.S. PATENT DOCUMENTS

| | | | |
|---|---|---|---|
| 3,433,998 | 3/1969 | Wölber | 315/393 |
| 3,613,109 | 10/1971 | Jarosz . | |
| 3,881,134 | 4/1975 | Haferl | 315/398 |
| 3,949,269 | 4/1976 | Wheeler | 315/371 |
| 4,063,134 | 12/1977 | Iida | 315/371 |
| 4,198,591 | 4/1980 | Ohmori | 315/371 |
| 4,482,846 | 11/1984 | Worster | 315/315 |
| 4,642,530 | 2/1987 | Rodriguez-Cavazos | 315/371 |
| 4,988,927 | 1/1991 | Spruck | 315/371 |
| 5,077,501 | 12/1991 | Hartmann et al. | 315/371 |
| 5,111,120 | 5/1992 | Haferl | 315/393 |
| 5,118,999 | 6/1992 | Jackson et al. . | |
| 5,402,044 | 3/1995 | Haferl | 315/371 |
| 5,442,262 | 8/1995 | Van Tiel | 315/371 |
| 5,444,338 | 8/1995 | George et al. | 315/371 |
| 5,448,140 | 9/1995 | Douken et al. | 315/371 |
| 5,583,400 | 12/1996 | Hulshof et al. | 315/371 |

FOREIGN PATENT DOCUMENTS 2042480 11/1991 Canada .
4116883 11/1991 Germany .

*Primary Examiner*—Gregory C. Issing
*Attorney, Agent, or Firm*—Joseph S. Tripoli; Joseph J. Laks; Marion P. Metelski

[57] ABSTRACT

An electron beam tends to slope downwardly as it is deflected horizontally to form a raster in a video display apparatus. The sloping of the beam can cause geometric errors in the raster, for example orthogonality and parallelogram errors. A raster correction circuit substantially offsets the downward slope of the electron beam by modulating a vertical deflection current with an induced horizontal-rate raster correction current, thereby substantially eliminating orthogonality and parallelogram errors in the raster. In respective embodiments of an inventive arrangement taught herein, the horizontal-rate raster correction current is induced in the vertical deflection coils by magnetically coupling a filament pulse waveform, a horizontal deflection voltage waveform, or a horizontal deflection current into the vertical deflection coils.

1 Claim, 7 Drawing Sheets

VERTICAL DEFLECTION CIRCUIT WITH RASTER CORRECTION

BACKGROUND OF THE INVENTION

1. Field of the Invention

This invention relates generally to the field of raster correction circuits, and, in particular, to correction of orthogonality and parallelogram errors in a raster of a cathode ray tube of a video display apparatus.

2. Description of Prior Art

In a cathode ray tube (CRT) of a video display apparatus, a raster is formed by deflecting at least one electron beam across a phosphor screen. Each electron beam is deflected in a horizontal direction by a magnetic field produced by the excitation of a horizontal deflection coil by a horizontal-rate sawtooth current. Likewise, each electron beam is simultaneously deflected in a vertical direction by a magnetic field produced by the excitation of a vertical deflection coil by a vertical-rate sawtooth current. The result is a negatively-sloped, or "downhill", scan line as the electron beam is deflected from left to right to form the CRT's raster. In a typical cathode ray tube used in a color television receiver and having a screen width of approximately 723 mm and a screen height of approximately 538 mm, a horizontal scan line may drop a distance of approximately 2.4 mm from a perfectly horizontal position in one field.

This downhill scan effect introduces both orthogonality and parallelogram errors into the raster, as shown in FIG. 1. In a perfectly rectangular raster, horizontal and vertical center lines are orthogonal, or perpendicular, to one another. Downhill scanning does not produce a perfectly rectangular raster and hence results in a non-orthogonal relationship between the horizontal and vertical center lines of the raster.

Orthogonality error is a quantitative measure, expressed in units of radians or degrees, of the extent to which the horizontal and vertical center lines of a raster depart from orthogonality. For a raster represented in terms of X and Y co-ordinates, as depicted in FIG. 2, the orthogonality error can be calculated with the following trigonometric formula:

$$\tan^{-1}\left(\frac{X12-X6}{Y12-Y6}\right)+\tan^{-1}\left(\frac{Y3-Y9}{X3-X9}\right).$$

A conventional downhill scan may produce an orthogonality error on the order of approximately 0.2°. A typical design tolerance for the orthogonality error in a CRT may be specified as ±0.3°.

The orthogonality error may be magnified at the left and right edges of the raster because, as is well-known, the deflection sensitivity of an electron beam increases as it approaches the edges of the raster. As a result, the edges of the raster may tilt such that the raster has a generally parallelogram shape.

Parallelogram error is a quantitative measure, expressed in units of radians or degrees, of the extent to which the shape of a raster approximates a parallelogram. For a raster represented in terms of X and Y co-ordinates, as depicted in FIG. 2, the vertical parallelogram error can be calculated with the following trigonometric formula:

$$\frac{\tan^{-1}\left(\frac{X10-X8}{Y10-Y8}\right)+\tan^{-1}\left(\frac{X2-X4}{Y2-Y4}\right)}{2}+\tan^{-1}\left(\frac{Y3-Y9}{X3-X9}\right).$$

The horizontal parallelogram error can be calculated with the following trigonometric formula:

$$\frac{\tan^{-1}\left(\frac{Y2-Y10}{X2-X10}\right)+\tan^{-1}\left(\frac{Y4-Y8}{X4-X8}\right)}{2}-\tan^{-1}\left(\frac{Y3-Y9}{X3-X9}\right).$$

In a conventional downhill scan, a typical orthogonality error may translate into a parallelogram error that is on the order of approximately 1.5 times the orthogonality error. For example, a conventional downhill scan that produces an orthogonality error of 0.2° may also produce a parallelogram error that is equal to approximately 0.3°. A typical design tolerance for the parallelogram error in a CRT may be specified as +0.5°.

If means are employed to correct side, or east-west, pincushion distortion in a raster, the downhill scan effect may cause a misalignment of a pincushion correction current envelope with respect to the pincushion curvature on the raster. Mitigation of this misalignment may result in an increase in the parallelogram error by an amount that may equal approximately 80%. Thus, for a conventional downhill scan that produces a parallelogram error equal to approximately 0.3°, the use of side pincushion correction may increase the parallelogram error to approximately 0.6°.

It is desirable to completely eliminate both orthogonality and parallelogram errors in a raster so that a CRT may display the highest-quality image. One possible solution requires rotation of the horizontal deflection coil relative to the vertical deflection coil in order to align the sloped horizontal center line of the raster with the horizontal center line of the CRT. The downhill scan effect is thereby eliminated, but this approach can, nonetheless, be problematic. First, this solution can affect convergence in the video display apparatus. Second, as the sloped horizontal center line is rotated toward the center line of the CRT, the pincushion curvature on the raster also rotates in order to maintain its original relationship with the sloped horizontal center line. Thus, while this solution can eliminate the orthogonality error, it does not address the component of the parallelogram error due to misalignment of the pincushion correction current envelope with respect to the pincushion curvature on the raster.

SUMMARY OF THE INVENTION

A raster correction circuit according to an inventive arrangement taught herein provides a horizontal-rate modulation of a vertical deflection current for substantially offsetting a downhill scan effect caused by vertical deflection of the electron beam. Orthogonality and parallelogram errors in the raster are thereby corrected.

Such a raster correction circuit comprises: a deflection coil for deflecting an electron beam responsive to a substantially sawtooth current waveform to form a raster; and, means for generating a corrective current coupled to the deflection coil to substantially eliminate a downward slope imparted to the electron beam by the deflection coil as the electron beam is deflected between first and second lateral edges of the raster.

The generating means may establish a substantially orthogonal relationship between left and right lateral edges of the raster, respectively, and a horizontal axis passing through a geometric center of the raster. The substantially sawtooth current waveform may have a vertical scanning rate. The corrective current may have a horizontal scanning rate and a substantially sawtooth shape. The corrective current may modulate the vertical-rate deflection current at the horizontal scanning rate.

A vertical deflection circuit for a video display apparatus, according to an inventive arrangement described herein, comprises: a deflection coil having first and second windings for deflecting an electron beam responsive to a substantially sawtooth current waveform to form a raster; a source of a horizontal-rate waveform; and, means for modulating the sawtooth current waveform with the horizontal-rate waveform.

In an embodiment of the vertical deflection circuit, the source may comprise a secondary winding of a high-voltage transformer that is coupled to a horizontal deflection circuit. The secondary winding of the high-voltage transformer may provide a horizontal-rate pulse waveform to a plurality of heaters of the video display apparatus.

In a further embodiment of the vertical deflection circuit, the source may comprise a winding coupled in series with a horizontal deflection coil of a horizontal deflection circuit.

In an even further embodiment of the vertical deflection circuit, the source may comprise a horizontal-rate pulse waveform generated by a horizontal deflection circuit.

The vertical deflection circuit may further comprise a series arrangement of a plurality of resistances coupled in parallel with the first and second windings of the vertical deflection coil. One of the plurality of resistances may comprise an adjustable resistance. The secondary winding of the raster correction transformer may further comprise a center-tap coupled to the adjustable resistance.

A deflection system for a video display apparatus, according to an inventive arrangement described herein, comprises: a vertical deflection circuit for periodically deflecting an electron beam from a top edge to a bottom edge of a raster; a horizontal deflection circuit for periodically deflecting an electron beam from a first lateral edge to a second lateral edge of the raster; and, a correction transformer for coupling horizontal-rate energy from the horizontal deflection circuit to the vertical deflection circuit for substantially eliminating a downward slope imparted by the vertical deflection circuit to the electron beam.

The above, and other features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
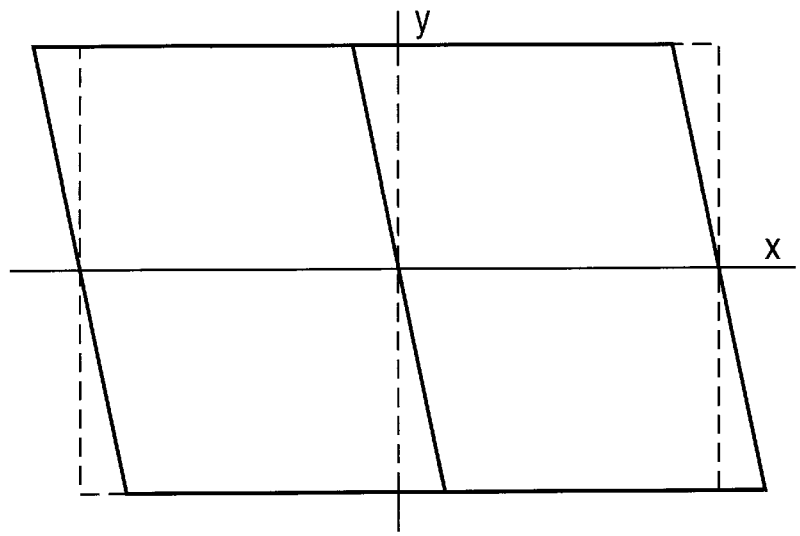
FIG. 1 is useful for explaining orthogonality and parallelogram errors in a raster.
Figure 2:
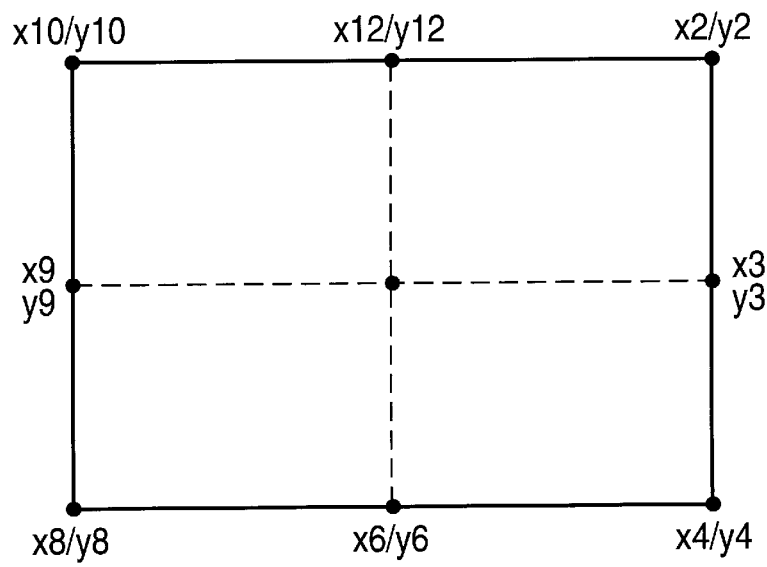
FIG. 2 is useful for explaining a raster of a cathode ray tube in terms of X and Y co-ordinates.
Figure 3:
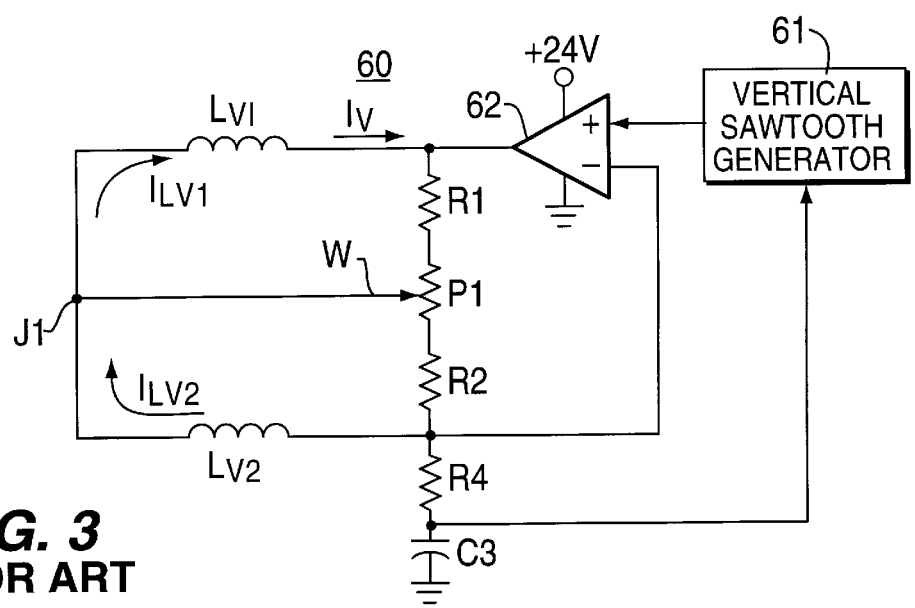
FIG. 3 is a schematic diagram of a prior-art vertical deflection system for a video display apparatus.

A prior-art vertical deflection circuit is shown in FIG. 3. A vertical-rate sawtooth generator 61 provides a vertical-rate sawtooth waveform to a non-inverting input of a vertical output amplifier 62. The vertical output amplifier 62 is coupled to a positive supply voltage, for example +24 V, and a negative supply voltage, for example a ground potential, and may comprise a complementary or quasi-complementary push-pull transistor output stage. The vertical output amplifier 62 drives first and second vertical deflection windings $L_{V1}$ and $L_{V2}$ of a vertical deflection coil with a vertical-rate sawtooth current $I_V$, which may have a peak-to-peak amplitude of approximately 2 A. A current-sense resistor R4 generates a feedback voltage at an inverting input of vertical output amplifier 62 responsive to the vertical deflection current $I_V$. Capacitor C3 provides S-correction for the vertical deflection current $I_V$.

Resistors R1 and R2 and potentiometer P1 are selected during the design of a deflection yoke for the cathode ray tube, and these resistances are included as part of the deflection yoke assembly. The three resistances are used to adjust the convergence of the electron beams within the cathode ray tube. The potentiometer P1 is adjusted to achieve a desired correction. For example, a junction J1 of first and second vertical deflection windings $L_{V1}$ and $L_{V2}$ is coupled to a wiper arm W of potentiometer P1. The potentiometer P1 may then be adjusted to achieve a desired crossover of the electron beams from the outer electron guns, typically red and blue, at a vertical center line of the cathode ray tube.

Figure 4:
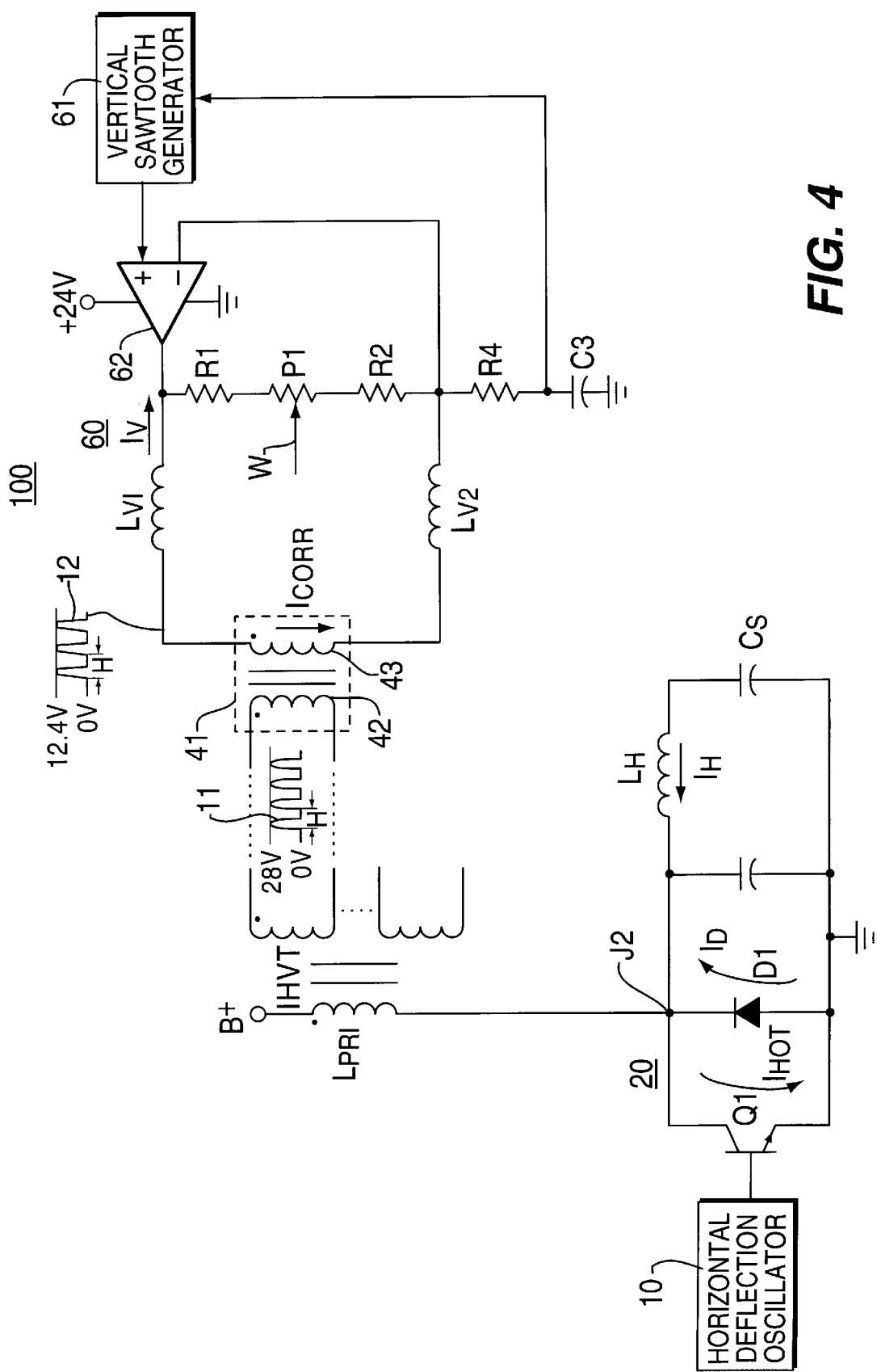
FIG. 4 is a schematic diagram of a first embodiment of a deflection system for a video display apparatus according to an inventive arrangement described herein.

A first embodiment of a deflection system 100 for a cathode ray tube of a video display apparatus, such as a television receiver or a video display terminal, is illustrated in block and schematic form in FIG. 4. A B$^+$ voltage of approximately 140 V is coupled to a horizontal deflection circuit 20 through a primary winding $L_{PRI}$ of an integrated high-voltage transformer IHVT.

The horizontal deflection circuit 20 may be of conventional design.

For example, the particular implementation of horizontal deflection circuit 20 shown in FIG. 4 is well-known in the art. A damper current ID flows through a damper diode D1 to deflect an electron beam from a left edge of a raster to a center of the raster. A horizontal output transistor Q1 conducts a current $I_{HOT}$ to deflect the electron beam from the center of the raster to a right edge of the raster. A horizontal deflection current $I_H$ flowing through horizontal deflection coil $L_H$ may have a peak-to-peak amplitude of approximately 7 A. Capacitor $C_s$ provides S-correction for the horizontal deflection current $I_H$.

The sum of resistances R1, R2 and P1 in vertical deflection circuit 60 is equal to approximately 200 Ω, with resistors R1 and R2 each equal to approximately 47 Ω and the nominal value of potentiometer P1 equal to approximately 100 Ω. The values and particular arrangement of resistances for the adjustment of electron beam convergence within the cathode ray tube may be varied by one skilled in the art according to the requirements imposed by the design of a particular deflection yoke for a particular cathode ray tube.

The integrated high-voltage transformer IHVT typically has several secondary windings, one of which may provide, for example, a horizontal-rate filament pulse 11, which may have a peak-to-peak voltage of approximately 28 V, for the respective heaters of the three electron guns of the cathode ray tube.

Raster correction transformer 41 has a primary winding 42 with approximately 144 turns and a secondary winding 43 with approximately 64 turns. The number of primary and secondary turns of raster correction transformer 41, and hence its turns ratio, may be varied by one skilled in the art according to the requirements imposed upon transformer 41 by a particular embodiment of deflection system 100.

Both windings are wound around a ferrite rod core which can have a diameter of approximately 5 mm and a length of approximately 30 mm. Such a core may, for example, have an industry part number EOR29 and may be manufactured by Nippon Co., Ltd. or by Hitachi Co., Ltd. The use of a rod core is illustrative, and is not intended to suggest that a core configuration which has a closed-loop magnetic path length, for example a toroid, cannot be used.

Transformer 41 steps down the horizontal-rate filament pulse 11 according to its turns ratio, which for the embodiment shown in FIG. 4 equals $$\frac{64}{144}.$$

Thus, raster correction transformer 41 provides a stepped-down horizontal-rate pulse waveform 12 with a peak-to-peak voltage of approximately 12.4 V across the secondary winding 43 and a raster correction current $I_{CORR}$ is induced in secondary winding 43.

Figure 5:
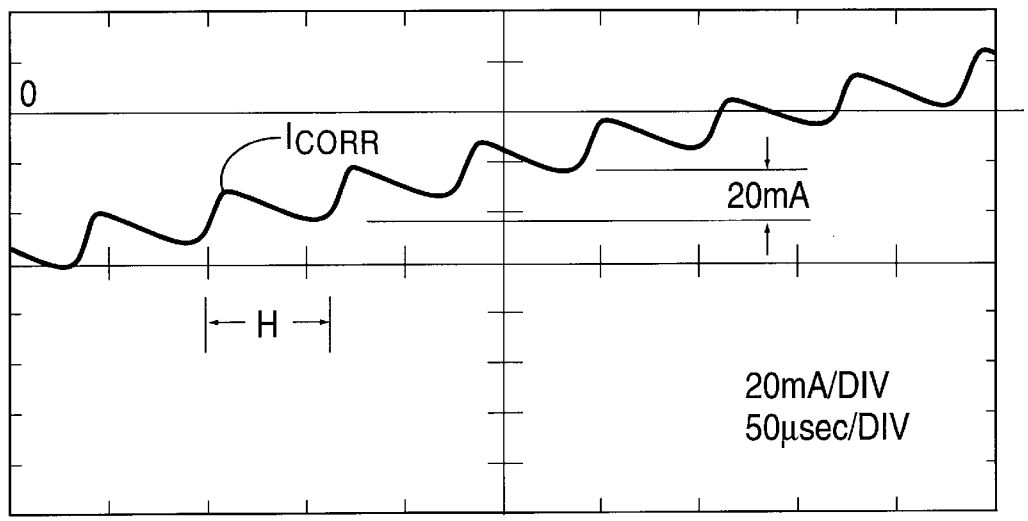
FIG. 5 shows a current waveform useful for explaining the operation of the deflection system shown in FIG. 4.

The raster correction current $I_{CORR}$ flows through both vertical deflection windings $L_{V1}$ and $L_{V2}$ at a horizontal rate and in a direction such that a magnetic field is created which opposes the downhill scan effect. In this way, the vertical deflection current is modulated at a horizontal rate, as shown in FIG. 5, and the downhill scan effect is substantially offset for each horizontal scanning line of the raster.

Figure 6:
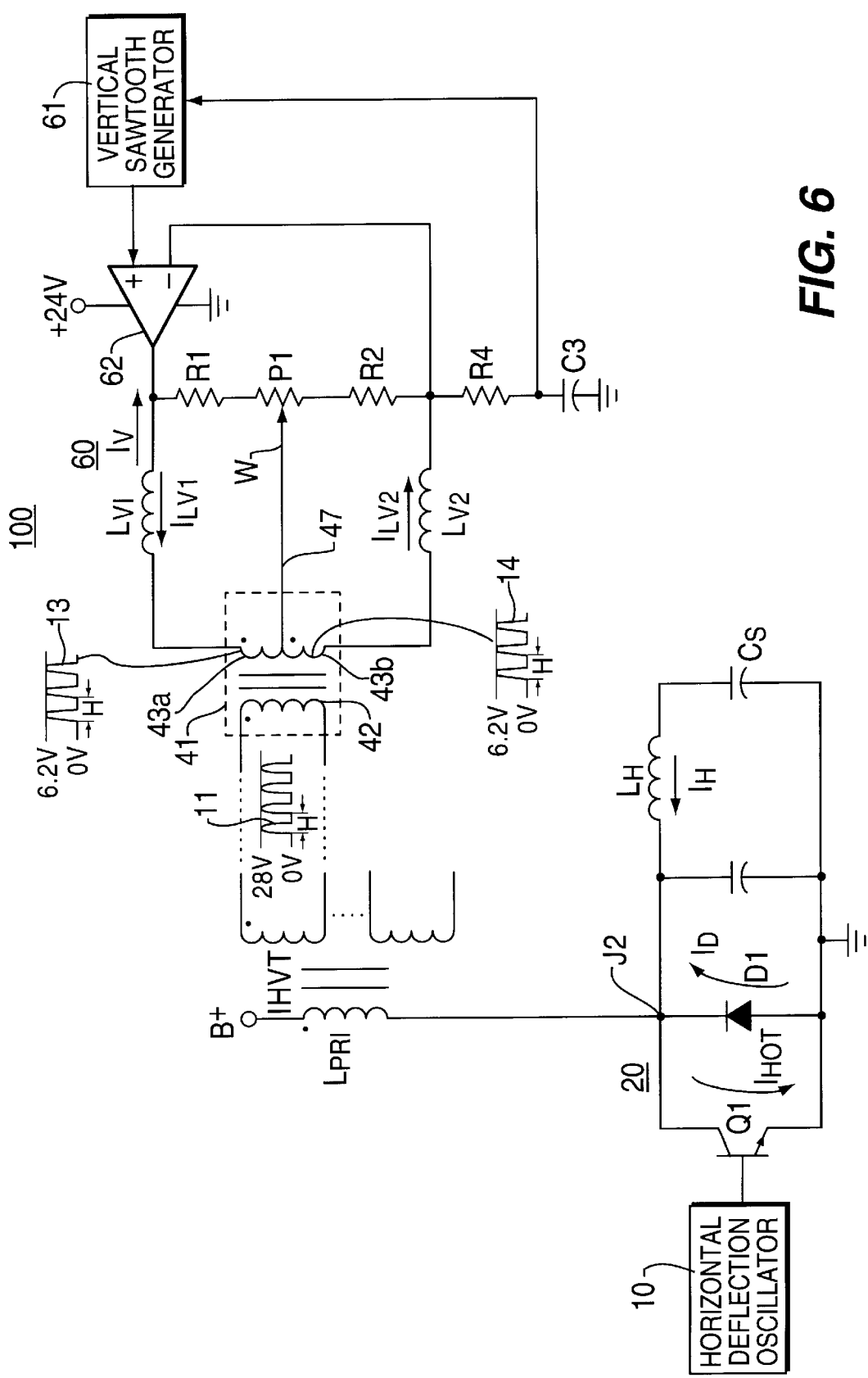
FIG. 6 is a schematic diagram of a second embodiment of a deflection system for a video display apparatus according to an inventive arrangement described herein.

A second embodiment of deflection system 100 is illustrated in FIG. 6. In this second embodiment, the secondary winding 43 of raster correction transformer 41 has a center-tap 47, which divides the secondary winding 43 into a first winding 43a and a second winding 43b. The center-tap 47 is coupled to the wiper arm W of potentiometer P1. The use of the center-tap 47 in this fashion is advantageous because it permits the nulling out of differences in voltage and magnetic field distribution between the first and second vertical deflection windings $L_{V1}$ and $L_{V2}$ by the adjustment of the wiper arm W, thereby achieving the desired crossover of the electron beams from the red and blue electron guns of the cathode ray tube, as discussed in relation to the prior-art vertical deflection arrangement shown in FIG. 3. Another advantage of connecting the center-tap 47 to the wiper arm W is a reduction of ringing across the secondary winding 43.

The horizontal-rate filament pulse 11 is stepped down in accordance with the turns ratio of raster correction transformer 41, and the stepped-down horizontal-rate pulse waveform 12 is divided substantially equally across first and second windings 43a and 43b of secondary winding 43. Thus, first and second windings 43a and 43b are provided with horizontal-rate pulse waveforms 13 and 14, respectively, each of which has a peak-to-peak voltage of approximately 6.2 V.

Figure 7:
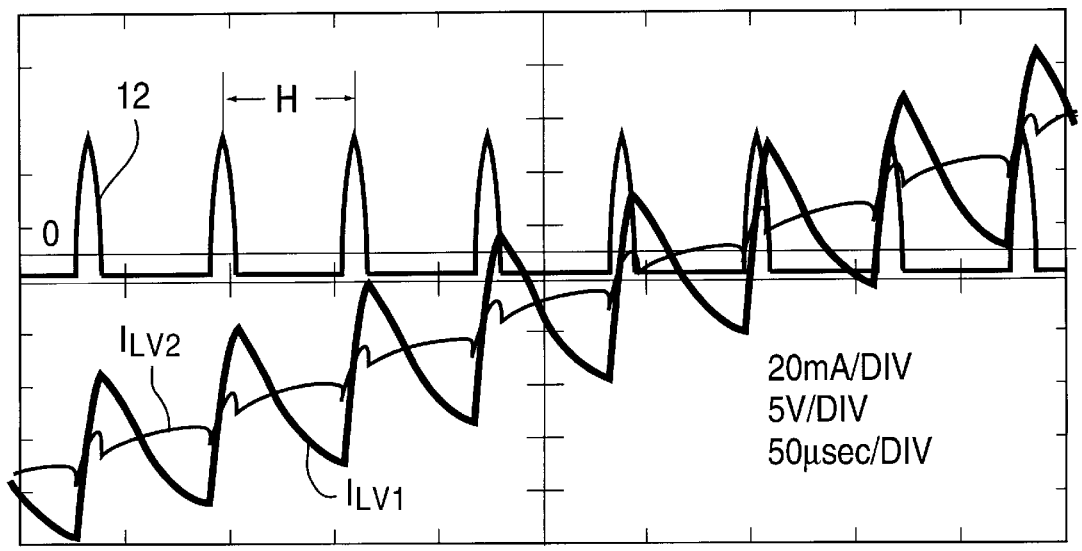
FIG. 7 shows voltage and current waveforms useful for explaining the operation of the deflection system shown in FIG. 6.

The stepped-down horizontal-rate pulse waveforms 13 and 14 across the first and second windings 43a and 43b, respectively, induce horizontal-rate raster correction currents $I_{LV1}$ and $I_{LV2}$ for the first and second vertical deflection windings $L_{V1}$ and $L_{V2}$, respectively. The raster correction currents $I_{LV1}$ and $I_{LV2}$ are not constrained to have equal peak-to-peak amplitudes, as seen in FIG. 7, by virtue of the connection of the center-tap 47 to the wiper arm W. The raster correction currents $I_{LV1}$ and $I_{LV2}$ flow through the first and second vertical deflection windings $L_{V1}$ and $L_{V2}$, respectively, at a horizontal rate and in a direction such that a magnetic field is created which opposes the downhill scan effect. In this way the vertical deflection current is modulated at a horizontal rate and the downhill scan effect is substantially offset for each horizontal scanning line of the raster. The horizontal-rate raster correction currents $I_{LV1}$ and $I_{LV2}$ are shown in FIG. 7.

Figure 8:
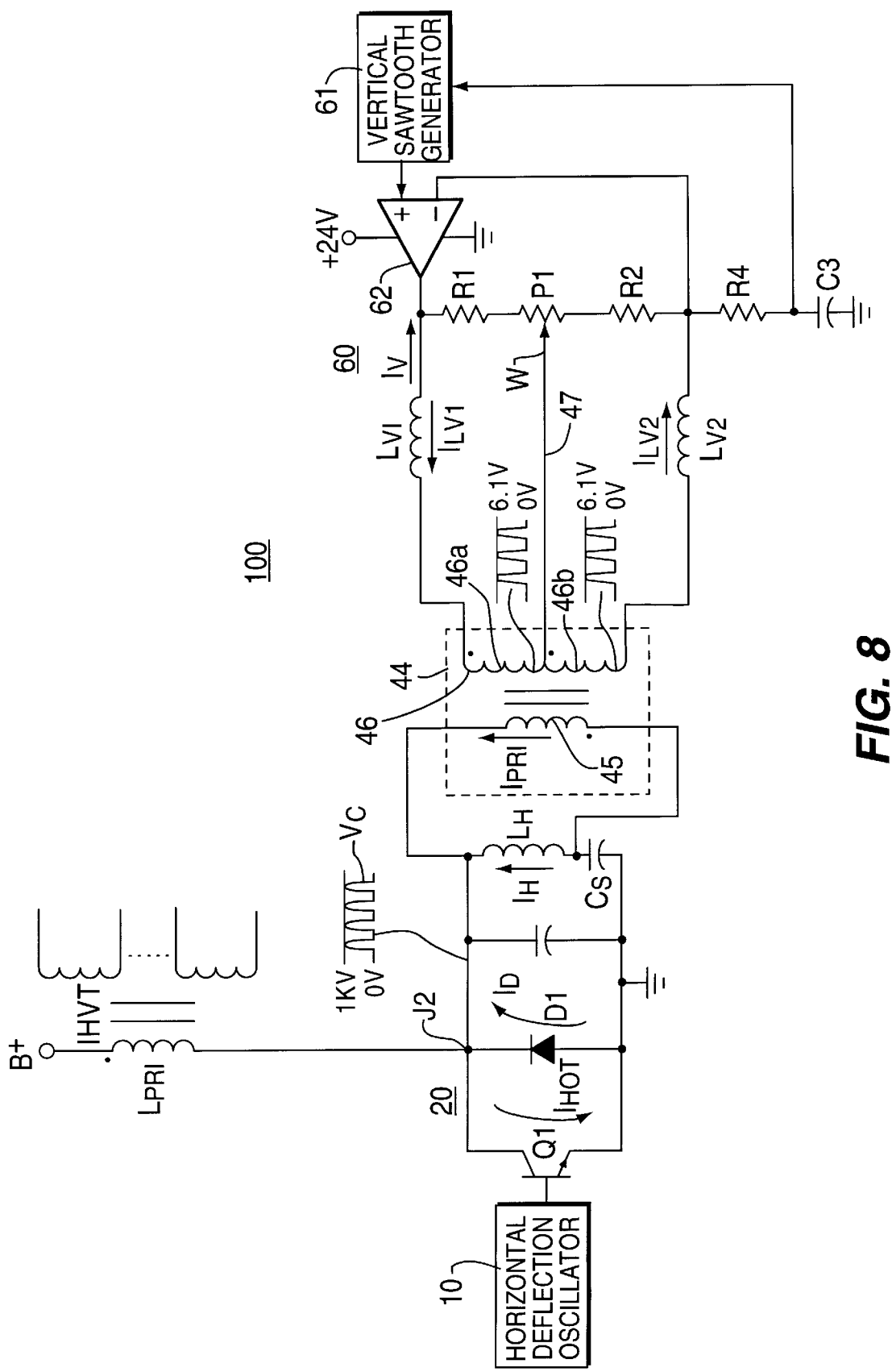
FIG. 8 is a schematic diagram of a third embodiment of a deflection system for a video display apparatus according to an inventive arrangement described herein.

In a third and presently preferred embodiment of deflection system 100, which is shown in FIG. 8, a raster correction transformer 44 has a primary winding 45 with approximately 1800 turns and a secondary winding 46 with approximately 22 turns. A center-tap 47 divides secondary winding 46 into a first winding 46a and a second winding 46b. The particular number of primary and secondary turns of raster correction transformer 44, and hence its turns ratio, is dependent upon the requirements of a particular deflection system 100 and is left to the judgment of one skilled in the art. Both windings 45 and 46 are wound around the same type ferrite rod core which was used in raster correction transformer 41 and, likewise, the use of a rod core with raster correction transformer 44 is merely illustrative.

The third embodiment differs from the first and second embodiments in that the primary winding of the raster correction transformer is coupled to the horizontal deflection circuit 20, rather than to a secondary winding of the integrated high-voltage transformer IHVT. Specifically, in the third embodiment, the primary winding 45 of raster correction transformer 44 is coupled between an ungrounded terminal of capacitor $C_S$ and a junction J2 of the horizontal deflection coil $L_H$ and a collector electrode of the horizontal output transistor Q11. A horizontal flyback pulse voltage wave form $V_C$ at junction J2 has a peak-to-peak amplitude of approximately 1000 V, and the voltage at capacitor $C_s$ is equal to approximately the B+ voltage because both primary winding $L_{PRI}$ and horizontal deflection coil $L_H$ appear as essentially short circuits to the B+ voltage.

It is advantageous to couple the primary winding 45 to the horizontal flyback pulse voltage wave form $V_C$ because the raster correction transformer 44 can then be mounted with the deflection yoke on a neck portion of the cathode ray tube of the video display apparatus. This simplifies assembly of the video display apparatus because it obviates the need to run wires from the chassis of the video display apparatus to the raster correction transformer.

The horizontal flyback pulse voltage wave form $V_C$ is stepped down in accordance with the turns ratio of raster correction transformer 44, which is equal to $$\frac{22}{1800}.$$

The stepped-down horizontal-rate pulse waveform has a peak-to-peak voltage of approximately 12.2 V and is divided substantially equally across first and second windings 46a and 46b of secondary winding 46.

Thus, first and second windings 46a and 46b are each provided with a horizontal-rate pulse waveform which has a peak-to-peak voltage of approximately 6.1 V.

Figure 9:
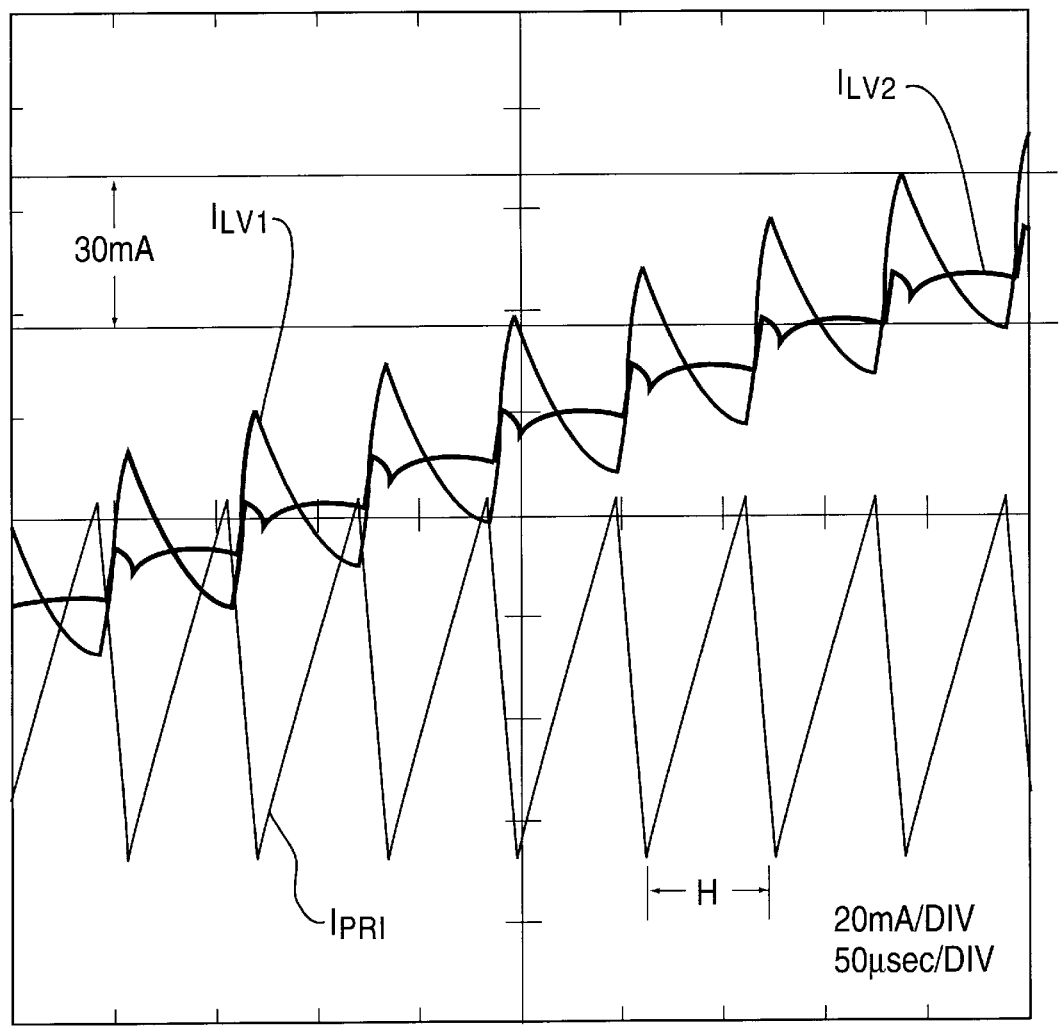
FIG. 9 shows current waveforms useful for explaining the operation of the deflection system shown in FIG. 8.

The stepped-down horizontal-rate pulse waveforms across the first and second windings 46a and 46b induce horizontal-rate raster correction currents $I_{LV1}$ and $I_{LV2}$ for the first and second vertical deflection windings $L_{V1}$ and $L_{V2}$, respectively. Raster correction currents $I_{LV1}$ and $I_{LV2}$ are not constrained to have equal peak-to-peak amplitudes, as seen in FIG. 9, by virtue of the connection of the center-tap 47 to the wiper arm W of potentiometer P1. The raster correction currents $I_{LV1}$ and $I_{LV2}$ flow through the first and second vertical deflection windings $L_{V1}$ and $L_{V2}$, respectively, in a direction such that a magnetic field is created which opposes the downhill scan effect. In this way the vertical deflection current is modulated at a horizontal rate and the downhill scan effect is substantially offset for each horizontal scanning line of the raster. The current $I_{PRI}$ through primary winding 45 and the horizontal-rate raster correction currents $I_{LV1\ and\ ILV2}$ are shown in FIG. 9.

Figure 10:
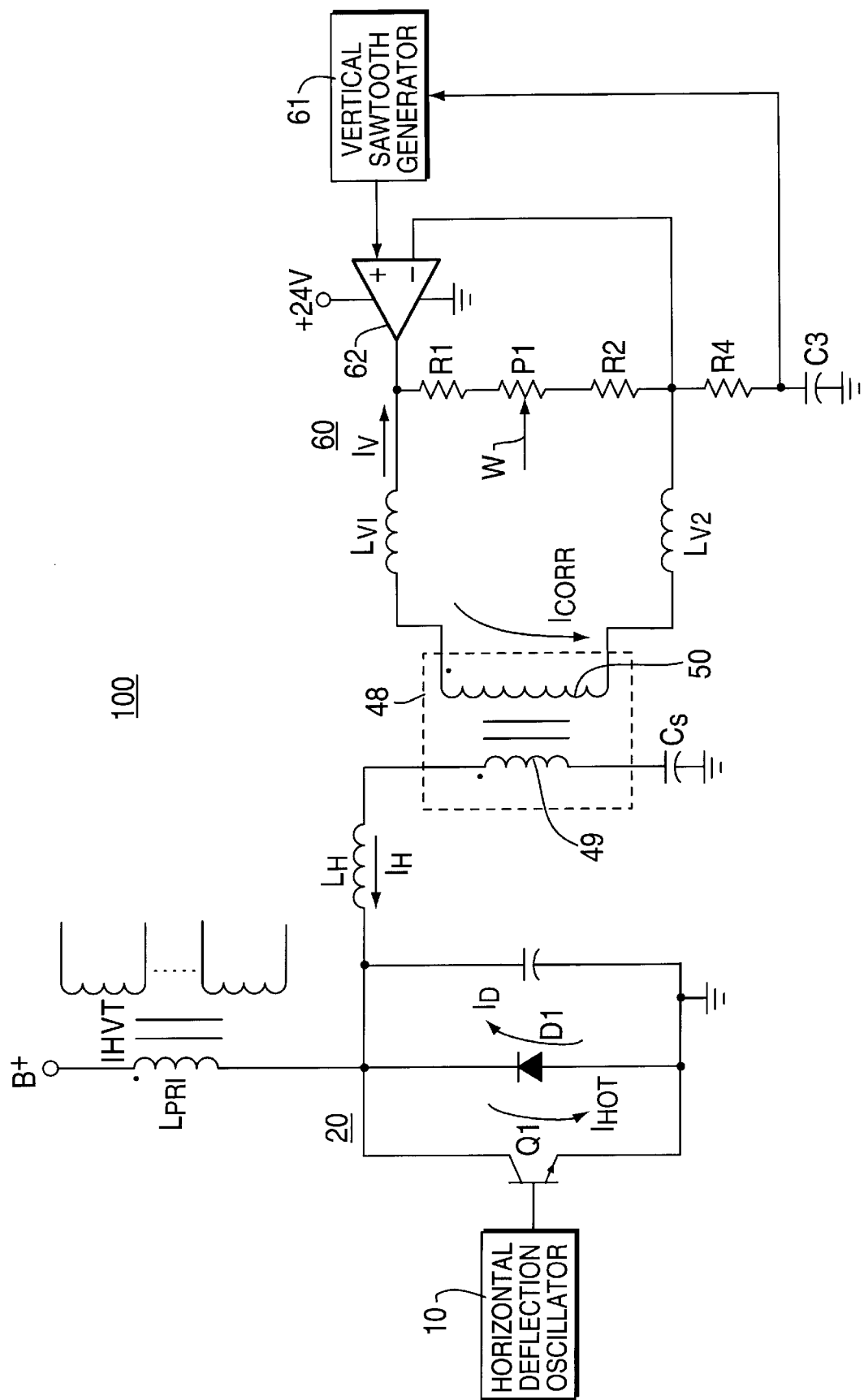
FIG. 10 is a schematic diagram of a fourth embodiment of a deflection system for a video display apparatus according to an inventive arrangement described herein.

A fourth embodiment of deflection system 100, which is shown in FIG. 10, may be employed most successfully when the downhill scan effect, and the orthogonality and parallelogram distortions produced by it, are relatively minor. A raster correction transformer 48 is utilized as a current transformer.

Raster correction transformer 48 has a primary winding 49 of approximately 3 turns coupled in series with the horizontal deflection coil $L_H$ of horizontal deflection circuit 20 and a secondary winding 50 of approximately 288 turns coupled in series with the first and second windings $L_{V1}$ and $L_{V2}$ of the vertical deflection coil. The number of primary and secondary turns of raster correction transformer 48, and hence its turns ratio, may be varied by one skilled in the art according to the requirements of a particular embodiment of deflection system 100. It is preferred to keep the number of turns in primary winding 49 at a minimum in order to prevent unwanted vertical-rate currents from being coupled into the horizontal deflection coil $L_H$. It is also preferred to keep the number of turns in secondary winding 50 at a minimum in order to prevent core saturation of transformer 48 by vertical deflection current $I_V$.

Both windings 49 and 50 are wound around the same type ferrite rod core which was used in the three previously described embodiments, and, like the previously described embodiments, the use of a rod core with raster correction transformer 48 is merely illustrative.

A horizontal deflection current $I_H$ flows through the primary winding 49 and is stepped down in accordance with the turns ratio of raster correction transformer 48, which is equal to $$\frac{288}{3}.$$

Figure 11:
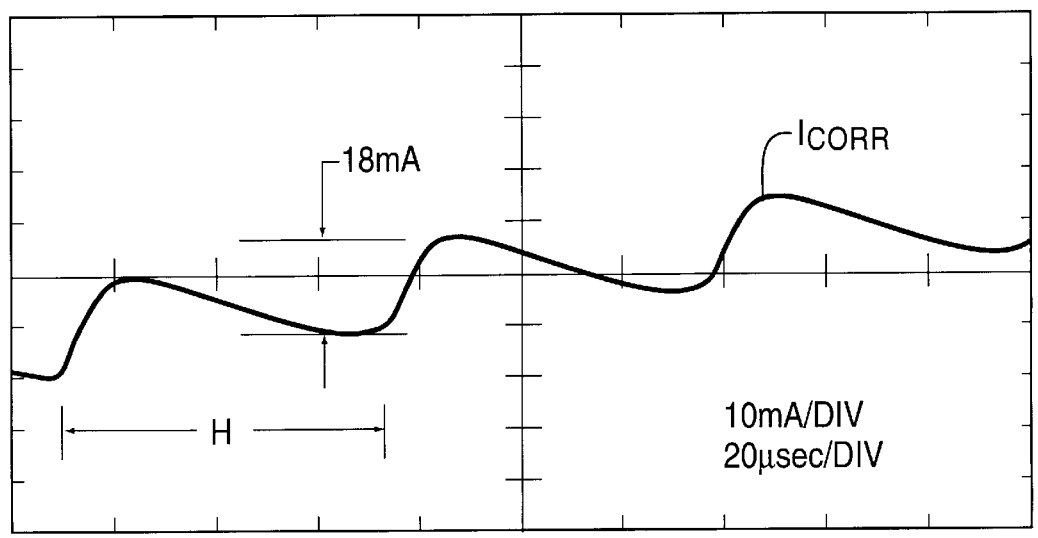
FIG. 11 shows a current waveform useful for explaining the operation of the deflection system shown in FIG. 10.

Thus, for a horizontal deflection current $I_H$ which has a peak-to-peak amplitude of, for example, 7 A, a raster correction current $I_{CORR}$ having a peak-to-peak amplitude of approximately 73 mA is induced in the secondary winding 50. This horizontal rate correction current $I_{CORR}$ flows through both first and second vertical deflection windings $L_{V1}$ and $L_{V2}$ to substantially offset the downhill scan effect for each horizontal scanning line of the raster. In this way the vertical deflection current is modulated at a horizontal rate and the downhill scan effect is substantially offset for each horizontal scanning line of the raster. The horizontal-rate raster correction current $I_{CORR}$ is shown in FIG. 11.

Implementation of deflection system 100 using raster correction transformer 48 is advantageous because a desired raster correction can be achieved while minimizing a voltage differential between primary and secondary windings 49 and 50, respectively. A minimum voltage differential between primary and secondary windings of a particular transformer is desirable because it significantly reduces the possibility that a voltage breakdown will occur in the transformer. For example, primary winding 45 of raster correction transformer 44 of FIG. 8 is coupled to a peak voltage of approximately 1000 V, while secondary winding 46 is coupled to vertical deflection circuit 60, which typically uses a supply voltage that is equal to approximately 24 V. This produces a voltage differential of approximately 1000 V from primary to secondary in raster correction transformer 44. In raster correction transformer 48 of FIG. 10, however, the voltage that appears across primary winding 49 is simply the B+ voltage, which is typically equal to approximately 140 V, while secondary winding 50 is again coupled to vertical deflection circuit 60. Thus, a voltage differential of only approximately 140 V appears from primary winding 49 to secondary winding 50; this significantly reduces the possibility that a voltage breakdown will occur in the transformer.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A deflection system for a video display apparatus, comprising:

a vertical deflection circuit having a vertical deflection coil for periodically deflecting an electron beam from a top edge to a bottom edge of a raster and an adjustable resistance coupled in parallel with said vertical deflection coil;

a horizontal deflection circuit having a horizontal deflection coil for periodically deflecting an electron beam from a first lateral edge to a second lateral edge of said raster; and, a transformer comprising:
a primary winding having a first terminal direct coupled to a first terminal of said horizontal deflection coil and a second terminal coupled to a second terminal of said horizontal deflection coil remote from said coil first terminal; and
a secondary winding coupled to said vertical deflection coil, said secondary winding including a center-tap coupled to said adjustable resistance;
said primary winding coupling a horizontal-rate flyback pulse voltage waveform from said horizontal deflection coil to said secondary winding for generating a sawtooth current in said secondary winding to affect said electron beam such that a parallelogram distortion of said raster is offset.

* * * * *